(No Model.)

J. BASSEMIR.
SPITTOON.

No. 272,518. Patented Feb. 20, 1883.

Witnesses:
Henry Gehling
Charles F. Bliss

Inventor:
John Bassemir
By Charles M. Stafford
Attorney

UNITED STATES PATENT OFFICE.

JOHN BASSEMIR, OF BROOKLYN, NEW YORK.

SPITTOON.

SPECIFICATION forming part of Letters Patent No. 272,518, dated February 20, 1883.

Application filed October 10, 1882. (No model.)

*To all whom it may concern:*

Be it known that I, JOHN BASSEMIR, a citizen of the United States, residing at Brooklyn, in the county of Kings and State of New York, have invented a new and useful Improvement in Spittoons or Cuspidors, of which the following is a full, clear, and exact description, reference being had to the accompanying drawings, making part of this specification, and the letters and figures marked thereon, in which—

Figure 1:
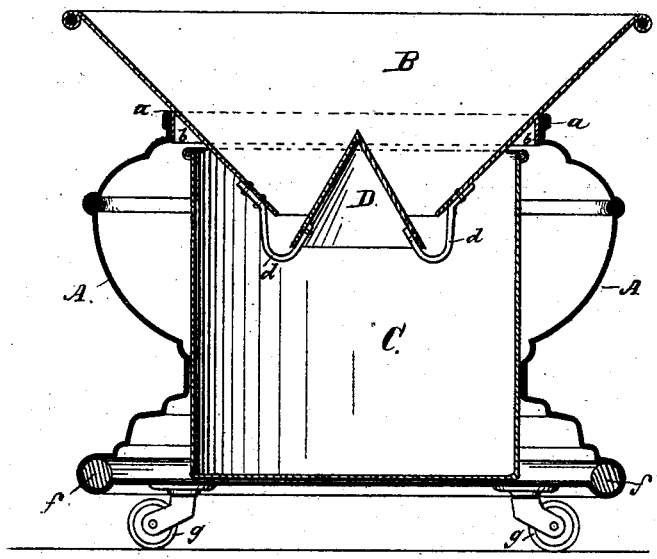
Figure 2:
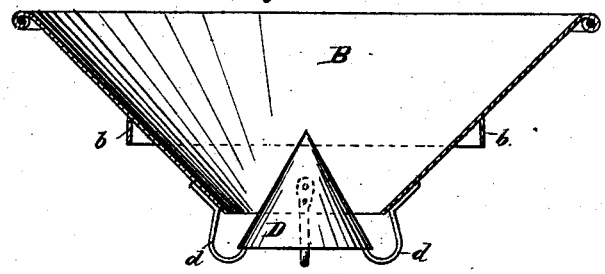
Figure 3:
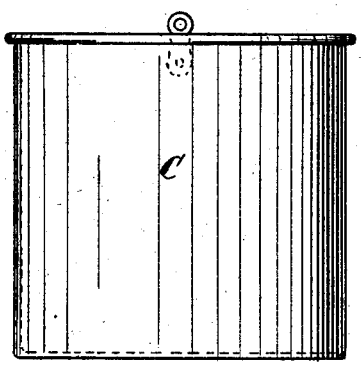

Figure 1 is a sectional view of my improved cuspidor. Fig. 2 is a sectional view of my detachable funnel with the deflector D attached by metal arms or joints *d d*. Fig. 3 is a side view of my pail or receptacle.

My invention relates to certain improvements in cuspidors of a combination of devices consisting—

First. Of a pail within the cuspidor, resting upon the bottom within a recess, and the neck thereof to catch and hold the contents of the cuspidor.

Second. Of a funnel for and separate from the cuspidor with a deflector attached thereto, whereby the contents thereof are deflected to the sides of the receptacle, entirely out of view. Thus with a movable funnel and pail it permits the pail or receptacle to be easily and conveniently emptied of its contents and cleaned.

Third. Of a heavy wire turned in around the base of the cuspidor *f f*, thereby greatly strengthening it, and it also serves as a counterweight to keep it in an upright position.

Fourth. Of casters fastened to its bottom to facilitate the operation of moving it from place to place. This feature of the cuspidor, however, is not new, as casters have long been in use for that purpose.

In the drawings, A A represents the form of the body of the cuspidor.

B is the removable top or funnel, provided with a conical or funnel-shaped deflector, D, secured to the funnel by metal arms or joints *d d*, for directing the liquid into the receptacle C.

*b b* shows the metal band or soldered flange round the under side of the funnel, near the top, which is inserted in the basin, fitting firmly and held securely.

C is the removable pail or receptacle, which sets securely in a recess and the neck of the basin or cuspidor at the bottom thereof, and extends to the top of the basin.

What I claim as my invention, and desire to secure by Letters Patent, is—

1. The improved cuspidor, constructed as described, and consisting of a basin or cuspidor and a funneled top provided with a deflector, and a metal band or flange encircling the under side of the funnel, near the top, which is inserted in the basin, whereby the funnel is firmly held to the basin, substantially as and for the purposes set forth.

2. A cuspidor composed of a basin and a deflector secured to a detachable funnel, whereby the expectorations, fluids, &c., are deflected to the sides of the receptacle, entirely out of view, substantially as and for the purposes set forth.

3. A cuspidor composed of a basin and a deflector secured to a detachable funnel provided with a removable pail or receptacle to catch the contents of the cuspidor, substantially as and for the purposes set forth.

Witness my hand this 7th day of October, 1882.

JOHN BASSEMIR.

In presence of—
ROBT. P. GETTY,
CHARLES F. BLISS.